UNITED STATES PATENT OFFICE.

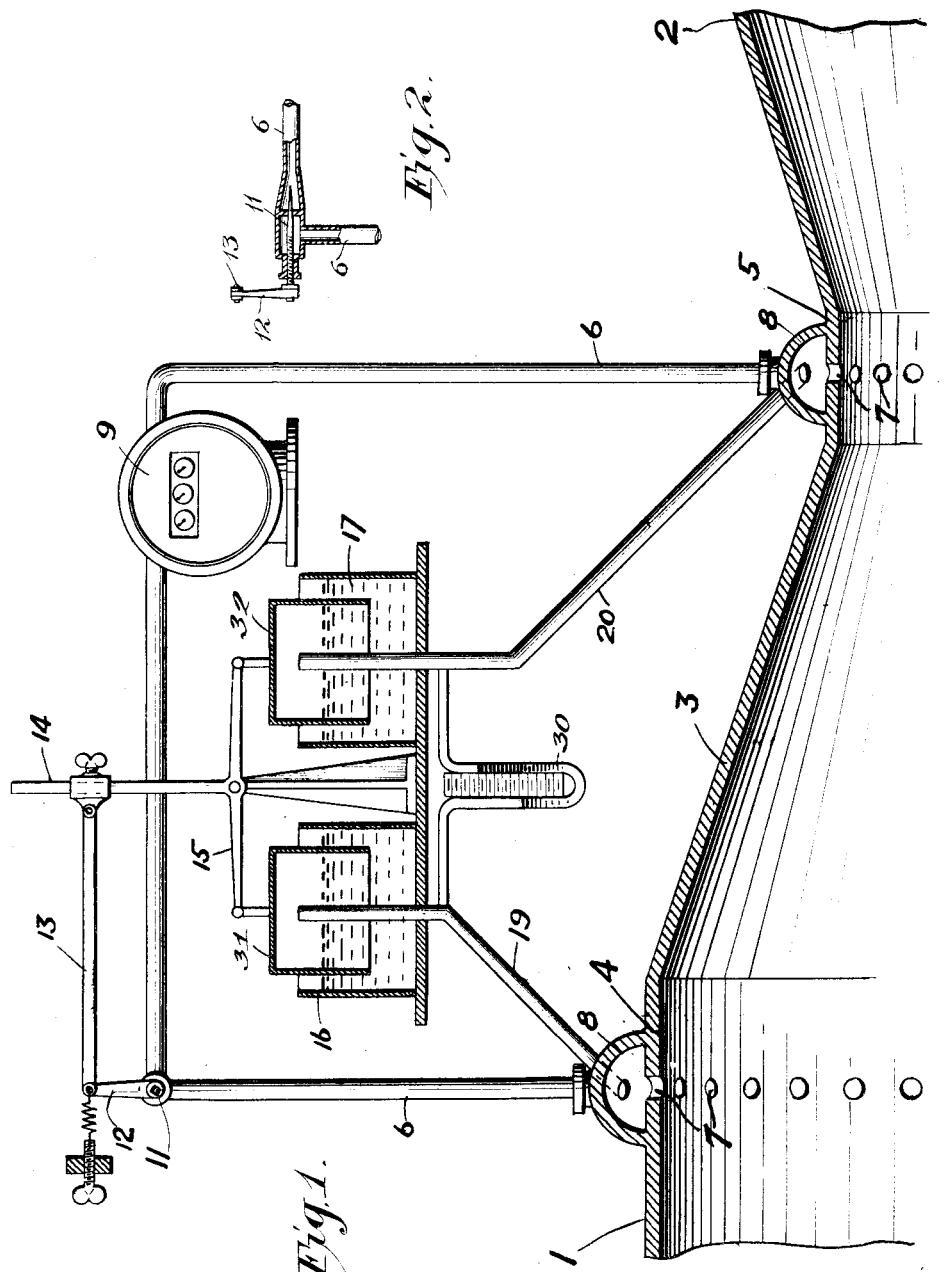

WALTER H. FULWEILER, OF MOYLAN, PENNSYLVANIA, ASSIGNOR TO THE UNITED GAS IMPROVEMENT COMPANY, OF PHILADELPHIA, PENNSYLVANIA, A CORPORATION OF PENNSYLVANIA.

REGISTERING-METER FOR GAS AND THE LIKE.

1,107,600.      Specification of Letters Patent.      Patented Aug. 18, 1914.

Application filed January 6, 1911. Serial No. 601,092.

*To all whom it may concern:*

Be it known that I, WALTER H. FULWEILER, a citizen of the United States, and a resident of Moylan, Delaware county, in the State of Pennsylvania, have invented a certain new and useful Registering-Meter for Gas and the like, of which the following is a specification.

My invention relates to improvements in proportional meters which comprise a measuring device adapted to operate by drop in pressure and a by-pass connected across the points between which exists the drop in pressure and of proportionate capacity to the measuring device and having interposed in it a registering meter and an adjustable impedance.

The object of the invention is to automatically maintain the accuracy of the proportional meter, even though the volume or flow being measured should change considerably.

To this and other ends hereinafter set forth the invention, generally stated, comprises the provision of means for automatically adjusting an impedance in series with the registering device and responsive to changes in the drop in pressure of the measuring device, whereby the proportion between the by-pass and measuring device is kept substantially constant for different rates of flow.

The invention will be claimed at the end hereof, but will be first described in connection with the embodiment of it selected, among various embodiments, for illustration in the accompanying drawings in which—

Figure 1 is a diagrammatic view, partly in section, illustrating a registering meter embodying features of the invention, and Fig. 2 is a detail view in section at right-angles to Fig. 1.

In the drawings 1 and 2 indicate respectively the inlet and outlet pipes or conduits through which the gas or like material to be measured flows in the direction from 1 to 2. Interposed in this pipe or conduit 1—2 is a meter shown as a Venturi tube or meter 3 having a mouth 4 and a throat 5. A Venturi meter operates without valves or moving parts and hence is a form of valveless measuring device. There is, of course, a difference in pressure at the mouth 4 and at the throat 5, and the mouth 4 and the throat 5 are connected by a branch or by-pass 6, the capacity of which is extremely small in comparison with the capacity of the conduit 1—2 and Venturi meter 3. As shown the mouth and throat of the Venturi meter are connected with the ends of the by-pass 6 by means of holes 7 which discharge into annular chambers 8. By this construction the effect of local currents, if any, is eliminated. Connected in the by-pass 6 is a registering meter 9 which may be of any appropriate variety, for example, either a wet drum or a dry registering meter. The capacity of this meter 9 is small in comparison with that of the meter 3 and since the meter 9 is small and only measures a proportionate amount of the gas or other fluid, it is comparatively inexpensive and easily kept in order and repair. Included in the by-pass 6 and on the inlet side of the meter 9 is an adjustable impedance shown to comprise a valve 11. This valve may be of the needle variety and its needle is connected with the screw stem to which the arm 12, is attached, so that as the arm is turned the needle is projected through a suitable opening and retracted therefrom, thus varying the size of the opening in the valve and therefore the impedance to the flow through it.

To adjust the described meter for use, reference is made to the difference in pressure between the mouth and throat of the Venturi tube 3. For this purpose reference can be made to the U-tube 30 and from this difference and the known capacity of the Venturi tube 3, the quantity of gas or other like substance, passing through the Venturi per unit of time can be ascertained by calculation. The meter 9 is then made to register a proportional part of the flow through the Venturi tube 3. For this purpose the needle-valve 11 is adjusted and since the flow through the meter 9 and by-pass 6 is registered and is known to be a proportional part of the flow through the Venturi tube 3, it is possible and easy to ascertain the total flow.

In the operation of the described apparatus there may be certain variables which may change the proportion of the flow through the meter 9 to the flow through the meter 3, such for example, as the varying resistances of the meter 9 due to changes of speed. However, the impedance is adjusted automatically. The needle valve is provided with an arm 12, connected by a link 13, with an arm 14 on a walking beam 15, to the ends of which the bells 31 and 32 of the seals 16 and 17 are connected. The space inside said bells are respectively connected with the mouth and throat of the Venturi tube by pipes or tubes 19 and 20, so that a change in drop in pressure between the mouth and throat operates to turn the arm 12 and thus appropriately varies the impedance.

A change in the quantity of flow from 1 to 2 produces a change in speed of the meter 9, which tends to change its impedance and such change in impedance if uncorrected would change the proportion between the by-pass and the measuring device. However, the change in quantity of flow from 1 to 2 also changes the drop in pressure between the mouth and throat and this change operating through the differential device automatically changes the impedance member 11 and restores the proper proportional flow and thus maintains the accuracy of the device.

What I claim is—

A proportional meter comprising a valveless measuring device adapted to operate by drop in pressure between two points of different pressures, a by-pass connected between said points of different pressures and of capacity proportionate to the measuring device, a registering meter interposed in the by-pass, an impedance member interposed in the by-pass in series with the registering meter, and means responsive to difference in pressure across said points and adapted to automatically adjust said impedance member to maintain the proportional capacity of the by-pass, substantially as described.

In testimony whereof I have hereunto signed my name.

WALTER H. FULWEILER.

Witnesses:
S. E. PATTERSON,
K. M. GILLIGAN.